United States Patent [19]

Plyler

[11] Patent Number: 5,025,754
[45] Date of Patent: Jun. 25, 1991

[54] APPARATUS AND METHOD FOR PROVIDING DRINKING WATER TO POULTRY

[76] Inventor: David Plyler, 6519 Prospect Rd., Monroe, N.C. 28110

[21] Appl. No.: 473,313

[22] Filed: Feb. 1, 1990

[51] Int. Cl.⁵ .............................................. A01K 7/00
[52] U.S. Cl. ........................................ 119/73; 119/77
[58] Field of Search ..................... 119/72, 73, 74, 77, 119/78, 79, 80

[56] References Cited

U.S. PATENT DOCUMENTS

| | | | |
|---|---|---|---|
| 648,922 | 5/1900 | Chace | 119/78 |
| 648,953 | 5/1900 | Hanson | 119/78 |
| 2,706,966 | 4/1955 | Cline | 119/74 |
| 2,865,328 | 12/1958 | Hostetler | 119/72 |
| 3,131,707 | 5/1964 | Cordis | 119/78 |
| 3,150,638 | 9/1964 | Franck et al. | 119/72 |
| 3,437,075 | 4/1969 | Hawes, Jr. et al. | 119/72 |
| 3,559,408 | 2/1971 | Earnhart | 119/74 X |
| 3,664,305 | 5/1972 | Hart et al. | 119/72 |
| 3,724,425 | 4/1973 | Thompson | 119/72 |
| 4,584,966 | 4/1986 | Moore | 119/73 |
| 4,630,569 | 12/1986 | Dieleman | 119/74 X |
| 4,724,797 | 2/1988 | Steudler, Jr. | 119/72.5 X |
| 4,794,881 | 1/1989 | Rader | 119/78 |

Primary Examiner—Eugene Mancene
Assistant Examiner—R. Thomas Price

Attorney, Agent, or Firm—Bell, Seltzer, Park and Gibson

[57] ABSTRACT

A drinking water distribution system for poultry is disclosed providing poultry such as turkeys and chickens with fresh clean drinking water. The system utilizes gravity feed to distribute water from a reservoir through a conduit to a series of water cups connected to the conduit in open communication with the conduit and extending upwardly therefrom. The conduit and reservoir are suspendingly supported above the floor of the poultry house by cables depending downwardly from overhead portions of the poultry house and connected to a winch so as to be easily raised to a suitable height to accommodate growth of the poultry. The system further monitors the water temperature and if the temperature of the water gets too warm, the system replaces it with water of a lower temperature. The invention further includes an arrangement for periodically purging and cleansing the system by replacing the drinking water with liquid disinfectant for a predetermined dwell period. At the end of the dwell period, the system is drained of the liquid disinfectant and replenished with water. A disinfecting solution may also be added to the drinking water to minimize growth of bacteria and germs. In a preferred embodiment, the drained liquid disinfectant is retained and used as the disinfecting solution to be added to the drinking water.

33 Claims, 3 Drawing Sheets

APPARATUS AND METHOD FOR PROVIDING DRINKING WATER TO POULTRY

FIELD OF THE INVENTION

This invention relates to an apparatus and method for providing drinking water to poultry such as turkeys and chickens in a poultry house.

BACKGROUND OF THE INVENTION

It is commonly known among poultry farmers that to increase the growth of the birds and therefore the profits of the farmer, that the birds should eat as much as possible and as often as possible. It is also known that the more water the birds drink, the more they eat. Accordingly, there are many devices for continuously supplying drinking water to the birds. However, the devices for accomplishing this apparently simple task have not been overwhelmingly successful.

There are many factors which affect the consumption of drinking water in a poultry house and which affect the design of systems for providing drinking water. For example, the birds tend to drink more water if the height of the dispensers is properly adjusted in relation to the height of the birds. Another factor which affects the consumption is the temperature of the drinking water. If the water temperature is excessively high, the birds tend to drink less. There are additional factors, some of which will be discussed below in relation to the invention.

An example of a conventional apparatus for providing drinking water to poultry is a self-filling water pan. A self-filling water pan is approximately one to two feet in diameter, about three to five inches deep and suspended from the ceiling of the poultry house. In a typical installation, a poultry house would include a row of such pans extending the length of the house and spaced apart along the row at about six to twelve feet. The water is conducted along pipes in the overhead portions of the poultry house and is carried down to the pans by a hose. The hose is provided with a weight sensitive valve to provide water when the pan becomes light (from the water being consumed by the birds) and to stop the flow when the pan is full so as not to overflow onto the floor of the poultry house.

The self-filling water pan, however, suffers many drawbacks. In particular, the water supply being in the upper portion of the poultry house where the heat is trapped in the summertime causes the drinking water to sometimes get extremely warm. This is in spite of the fact that the water is typically supplied from an underground well at about 55 degrees Fahrenheit. Secondly, as it is desirable to adjust the height of the pans as the birds grow, each pan must be adjusted individually. This is a tedious and time consuming task, particularly in view of the number of pans in a typical poultry house. A further drawback of the self-filling pans is that the standing water therein is conducive to the growth of germs, bacteria and other undesirable elements. Moreover, once the germs and bacteria are established in the pans, the pans provide an excellent means for communicating the germs and bacteria to all the birds in the flock. While it is conventional to clean and disinfect the watering apparatus between broods, while performing other poultry house maintenance, it is impractical to clean the pans during the raising of a brood except in the most extreme circumstances.

Other devices for providing drinking water to poultry are illustrated in U.S. Pat. No. 2,771,058 issued Nov. 20, 1956 to Howard and U.S. Pat. No. 3,122,131 issued Feb. 25, 1964 to Warren. These devices comprise a trough with one end having an enlarged portion with a float valve therein to regulate the water level. These devices are generally similar to the self-filling pans discussed above and therefore suffer similar drawbacks.

One proposed improvement over the pan type water system is a nipple type pressurized system which includes a generally horizontal pipe suspended from the upper portion of the poultry house with a number of nipple valves dependingly arranged at spaced locations along the lower portion of the pipe. An example of such a device is U.S. Pat. No. 4,724,797 issued Feb. 16, 1988 to Steudler. This type of device, while avoiding the standing water drawback above, suffers an additional drawback in that the valves tend to become easily clogged by impurities in the water causing expensive maintenance and reliability problems. The problems are particularly troublesome for turkey watering systems because turkeys receive many different types of treatments through the watering apparatus whereas chickens would get similar treatments mixed with the dry feed.

In another pressurized system, water is carried by a conduit having a number of upstanding cups thereon. A valve is provided between the cup and the conduit with an upstanding valve trigger. The birds activate the valve trigger so that the valve opens to allow the pressurized water to evacuate debris and sediment from the cups while filling the cups with fresh water. However, as with the nipple valve system described above, the valves are very small and tend to get clogged with minerals and impurities in the water over an extended period of time. Thus, the system will suffer substantial reliability and maintenance costs. Also, as with the nipple systems, the problem is significantly worse for turkey farmers which provide medicine and nutrients through the watering system. Accordingly, turkey farmers have avoided using this type of watering system.

Accordingly, it is an object of the present invention to provide an apparatus and method for providing water to poultry which avoids the above noted limitations and disadvantages of the prior art.

It is a particular object of the invention to provide an apparatus and method for providing water to poultry in a simple and reliable manner.

It is a more particular object of the invention to provide an apparatus and method for providing water to a poultry house for poultry utilizing gravity feed to supply water to a plurality of water cups which are suspendingly supported above the floor of the poultry house and wherein the cups may be easily raised to a suitable height above the floor to accommodate the birds as they grow.

It is also an object of the present invention to provide an apparatus and method for providing water to poultry wherein water in the system is replaced when it is above a predetermined temperature.

It is another object of the present invention to provide an apparatus and method for supplying drinking water to poultry wherein the distribution system is periodically purged and cleansed so as to reduce the exposure of the poultry to potentially harmful bacteria and germs.

SUMMARY OF THE INVENTION

The above and other objects and advantages of the present invention are achieved by the provision of an apparatus and method for providing drinking water for poultry. The invention comprises a relatively long poultry house of the conventional type having an earthen floor for the raising of fowl, such as turkeys, in combination with a gravity feed water distribution system for providing drinking water for the fowl in the poultry house. The gravity feed water distribution system is characterized by leaving the floor of the poultry house substantially free of obstruction to movement of the fowl thereabout and may readily be adjustably elevated as the fowl grow and increase in height. At times the gravity fed water distribution system may be elevated to much higher levels to provide clearance for a tractor when it is desirable to till or clean the earthen floor of the poultry house. The gravity feed water distribution system comprises a reservoir for water wherein the level of water in the reservoir is controlled, an elongate conduit connected in fluid communication to the reservoir and arranged to extend longitudinally throughout a substantial portion of the long poultry house, and a plurality of drinking stations extending along the conduit and comprising spaced apart serially arranged water cups connected in open fluid communication to said conduit and extending upwardly therefrom. The water distribution system further comprises an arrangement supported from upper portions of the poultry house for supportingly carrying the reservoir, conduit and drinking stations and for adjustably raising the same while maintaining the relative height relationship between said reservoir and said water cups, wherein as the fowl grow and increase in height, the drinking stations may be raised without impairment of the gravity feed of the water to the drinking stations.

The present invention also includes an apparatus and method for providing water to poultry which replaces water when the temperature of the water exceeds a predetermined temperature. In accordance with this aspect of the invention, drinking water is delivered through a conduit to a plurality of drinking stations at which the poultry may drink. The temperature of the drinking water is sensed at a predetermined location along the path of flow of the water and is replaced with cooler water in response to the sensed temperature of the water in the conduit exceeding a predetermined temperature.

The present invention also includes an apparatus and method for providing drinking water for poultry which includes a periodic purging and cleansing cycle to kill germs and bacteria. In accordance with this aspect of the invention, drinking water is delivered through a conduit to a plurality of drinking stations at which the poultry may drink. For the purging and cleansing cycle, the delivery of drinking water to the conduit is interrupted and the water in the conduit and drinking stations is replaced with a cleansing liquid. The cleansing liquid in the conduit and drinking stations is drained after a predetermined dwell period and the cleaned conduit and drinking stations are replenished with water.

The preferred embodiment of the present invention further includes reusing the cleansing liquid from the cleansing cycle. The cleansing liquid is preferably a liquid disinfectant and is reused by retaining the liquid when it is drained from the conduit. The liquid is subsequently added back to the drinking water in small quantities so as to limit the growth of germs and bacteria between cleaning cycles.

BRIEF DESCRIPTION OF DRAWINGS

Some of the features and advantages of the invention have been stated, and others will become apparent as the description proceeds when taken in conjunction with the accompanying drawings in which.

DETAILED DESCRIPTION OF THE PREFERRED EMBODIMENT

Figure 1:
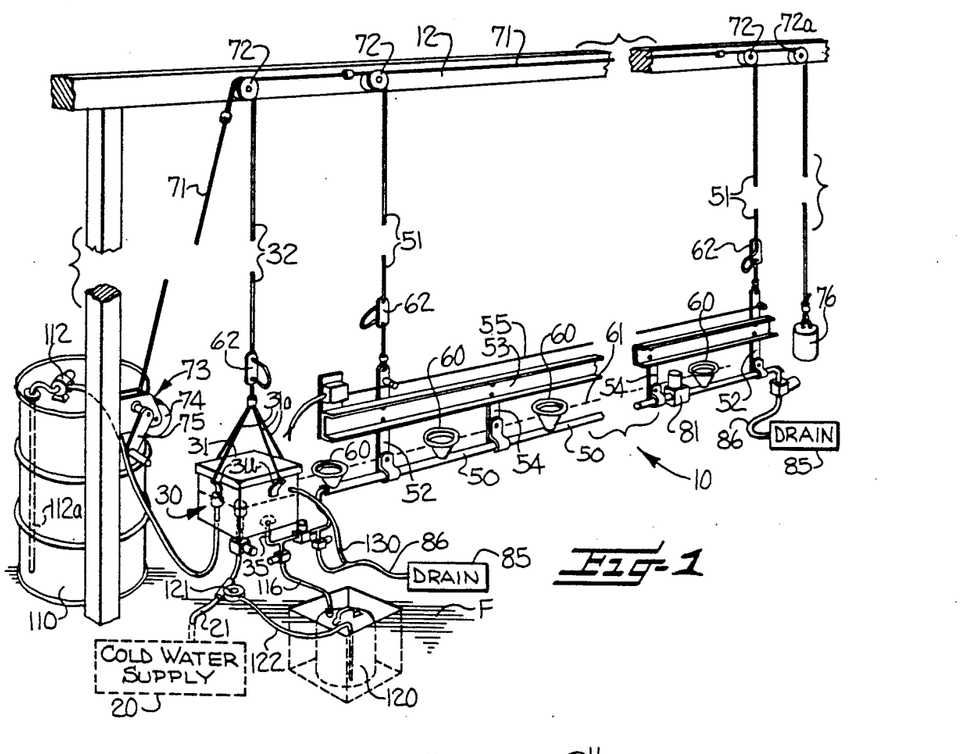
FIG. 1 is a schematic view of a gravity feed drinking water distribution system for providing drinking water to poultry in a poultry house and embodying the features of the present invention.
Figure 2:
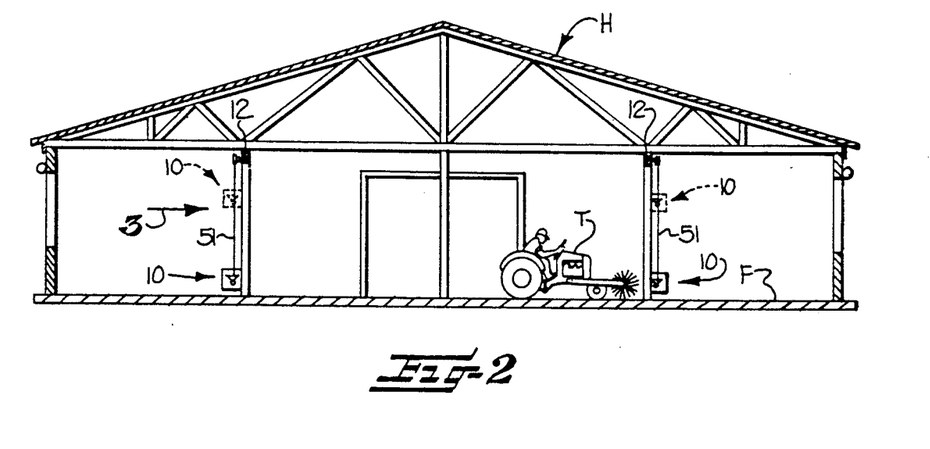
FIG. 2 is a cross-sectional elevation view of a poultry house particularly illustrating the location of the drinking water distribution system therein.

Referring now more particularly to the drawings, a gravity feed water distribution system for poultry is illustrated in FIG. 1 and is generally referred to by the numeral 10. The water distribution system 10, as illustrated, is suspended from overhead portions of a poultry house H (FIG. 2) such as a beam 12. In this manner, the system 10 is disposed generally horizontally above the floor F (FIGS. 2, 3, 6) for a substantial length of the long poultry house H. In a typical arrangement, the poultry house H may be several hundred feet long with a water distribution system 10 sized to correspond with the length to the poultry house H. In the preferred embodiment, however, the poultry house H is approximately five-hundred feet long, which is typical for raising turkeys, and utilizes four separate water distribution systems 10, each of about 250 feet in length. The four systems are arranged in pairs, two disposed end-to-end along generally parallel beams 12 on opposite sides of the poultry house H. As will be more clearly explained below, the system lo includes drinking or water stations at many locations along the length of the poultry house H so as to accommodate a large number of birds drinking at one time and so as to have a drinking or water station relatively nearby to all locations in the poultry house H.

Referring more specifically to FIG. 1, water is provided from a cold water supply schematically indicated by the numeral 20. The cold water supply 20 is typically an underground well which includes a pump for providing pressurized water at a temperature of about 55 degrees Fahrenheit. The cold water supply 20 is connected by a feed hose 21 to a reservoir 30. The feed hose 21 is preferably a flexible hose similar to a garden hose and is arranged to run along the floor F of the poultry house H where it is cool as opposed to the warmer overhead portions of the poultry house. The reservoir 30 may be any suitable shape that has a relatively small capacity of about a half gallon to about three or four gallons.

Figures 3, 4, 5:
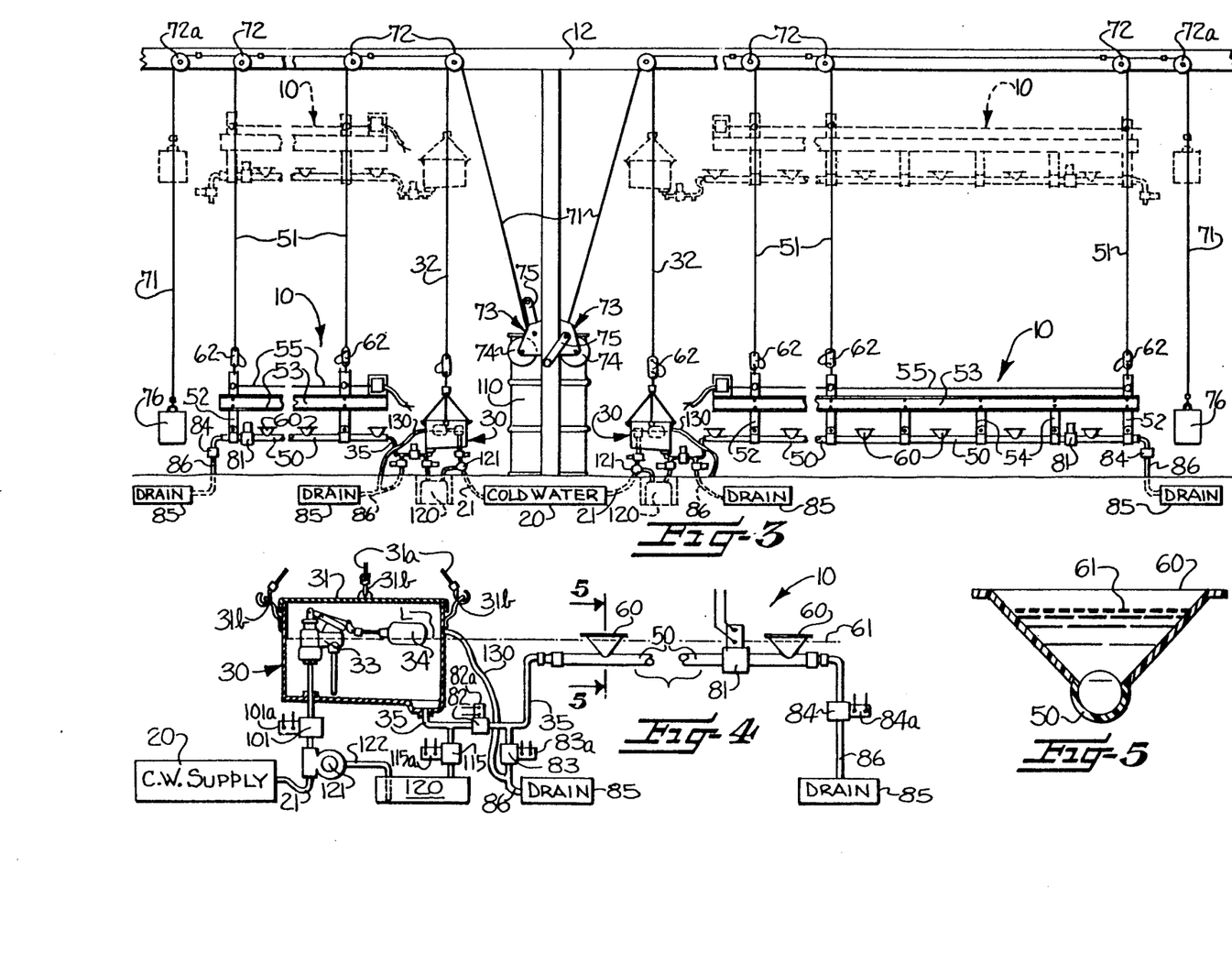
FIG. 3 is a fragmentary side elevation view of the gravity feed water distribution system taken in the direction of Arrow 3 in FIG. 2.
FIG. 4 is an enlarged elevation view of the reservoir, conduit and drinking stations so as to better illustrate the components of the gravity feed water distribution system.
FIG. 5 is a cross-sectional view taken along Line 5—5 in FIG. 4.
Figure 6:
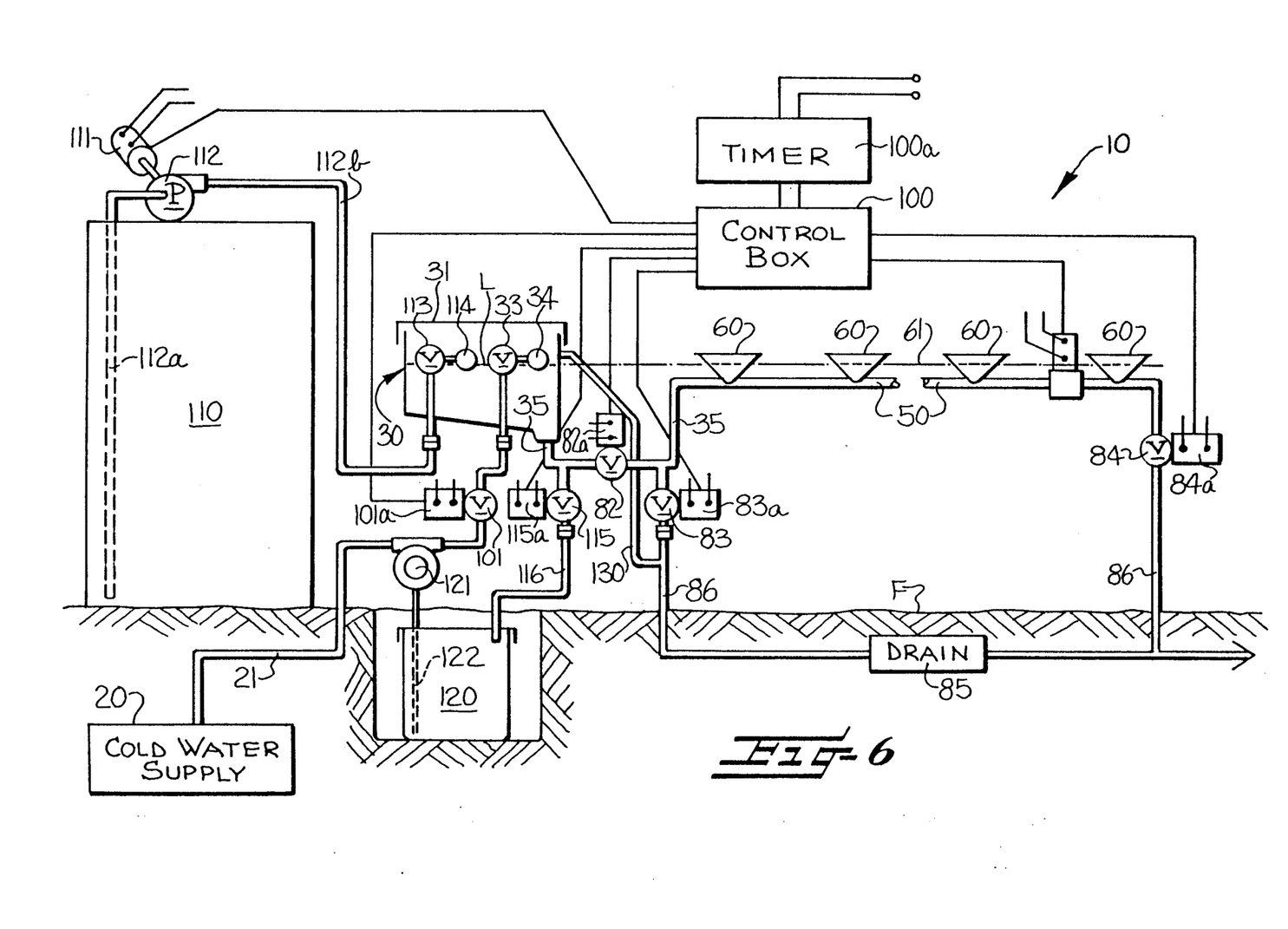
FIG. 6 is a schematic view of the gravity feed water distribution system particularly illustrating the control system therefore.

Referring to FIGS. 1, 4 and 6, the reservoir 30 preferably has a cover 31 to keep dust and sediment out of the water and is suspended from the beam 12 by a cable 32 (FIG. 1). Suitable connector cables 31a and hooks 31b on the reservoir 30 may be employed to stabilize and level the reservoir 30. The reservoir 30 further includes a float valve 33 (FIGS. 4 and 6) connecting to the hose 21 so as to control the flow of water from the cold water supply 20 and for maintaining a predetermined water level L within the reservoir 30. The float valve 33 is a conventional float valve with a float 34 floating on the surface of the water so as to sense when the water level in the reservoir 30 drops below the predetermined level L and to then cause additional water from the cold water supply 20 to flow into the reservoir 30 until the water level corresponds to the predetermined water level L.

The water distribution system lo further includes a connector hose 35, which is preferably a flexible hose similar to a garden hose, and is connected to the bottom or a lower portion of the reservoir 30. The other end of the connector hose 35 is connected to a conduit 50. The conduit 50 is an elongate generally rigid conduit extending within the poultry house H so as to distribute drinking water to the birds. In the preferred embodiment, the conduit 50 is about 250 feet long and is formed of relatively rigid half-inch to two-inch diameter PVC pipe, with about three quarters to one inch pipe being preferred. As an alternative arrangement, not shown, the conduit 50 may be formed of sections of PVC pipe having different diameters. For example, in a first section connected to the connector hose 35, the conduit 50 may be one inch diameter pipe which extends for 100 feet. Connected to the first section by a reducing connector may be a second section extending 75 feet and formed of three quarter inch pipe. A third section also extending 75 feet is comprised of half inch diameter pipe. Accordingly, the conduit extends approximately 250 feet while being sized for the anticipated volume of water flowing through each section. However, in the illustrated embodiment, the conduit 50 is of uniform diameter for the entire length thereof.

The conduit 50 carries a series of drinking stations in the form of spaced apart upwardly extending water cups 60 which each have an opening at the bottom portion thereof connected in open fluid communication with the conduit 50. Thus, the water passing through the conduit 50 fills the cups 60 from the bottom. The water cups 60 may take various shapes although the preferred shape is the squatty inverted conical shape best illustrated in FIG. 5. It is believed that the preferred shape of the cups 60 is ideal for a bird such as a turkey or chicken to reach into a cup and scoop water into the beak and tip its head back to swallow. The cups 60 are spaced apart about 12 to 30 inches and preferably about 18 inches apart so as to provide a significant number of drinking stations in the poultry house H. Each of the cups 60 defines a drinking or water station at which one or more birds may drink.

In view of the relatively long length of the conduit 50, it is further provided with spaced apart support brackets 52 to enhance the rigidity of the conduit 50. Each of the support brackets 52 are connected to a cable 51 which depends down from the overhead as will be explained below. A rigid horizontally disposed channel bar 53 is connected to the support brackets 52 so as to extend parallel to the conduit 50 and spaced thereabove so as not to interfere with the birds drinking from the cups 60. A number of stiffening brackets 54 are connected to the conduit 50 and the channel bar 53 at closely spaced intervals to further support the conduit 50. An additional feature of the preferred embodiment is an anti-roosting wire 55 disposed at a close spacing above the channel bar 53. The wire 55 carries an electric current provided by a suitable electric supply which is uncomfortable for the birds to touch. Thus, the birds do not roost on the system 10 and the system does not have to be designed to handle the weight of a large number of birds.

As is best illustrated in FIG. 4, the reservoir 30 and drinking cups 60 are both supported above the ground and are arranged at a height so that the predetermined water level L within the reservoir 30 is at the same height as the desired water level 61 in the drinking cups 60. As will be explained below, the water in the system 10 will seek a uniform level by gravity with the height of the predetermined water level L in the reservoir 30 and the desired water level 61 in the drinking cups 60 being the same. To adjust the relative heights of the cups 60 with the reservoir 30, or to adjust the conduit 50 to be horizontal is quite simple when the system is filled with water. Clasps 62 are provided cooperating with each of the cables 32 and 51 supporting the reservoir 30 and the conduit 50 for adjusting the effective length of each of the cables 32 and 51. Thus, the reservoir 30 and the conduit 50 may be easily adjusted at their desired relative levels, and it is unlikely that the clasps 62 would need to be further adjusted.

One of the important features of the present invention is the ability to easily raise and lower the water distribution system 10. This feature is accomplished by an overhead system of cables. In particular, referring to FIG. 1, the cables 32 and 51 are connected to a main cable 71 which extends along the overhead for about the length of the conduit 50 and preferably beyond each end. The cables 32 and 51 each extend over and downwardly from one of a series of pulleys 72 which are spaced along the beam 12. The main cable 71 is also carried by the pulleys 72. The main cable 71 is connected to a winch 73, at one end thereof, preferably at the end which corresponds to the end of the conduit where the reservoir 30 is located. The winch 73 is preferably a conventional hand operated winch having a take-up spool 74, a crank arm 75 and a ratchet and pawl lock (not shown) to lock the spool 74 from rotating and unwinding the main cable 71. At the other end of the main cable 71, which extends downwardly from the end pulley 72a, is a weight 76 to provide tension on the cable 71. Accordingly, since the cables 32 and 51 are connected to the main cable 71, lengthwise movement of the main cable 71 uniformly raises and lowers all the cables 32 and 51 uniformly. Therefore, the reservoir 30, conduit 50 and the water cups 60 may be quickly and easily raised and lowered by an operator at the winch 73.

The operator may raise the reservoir 30, conduit 50 and water cups 60 incremental amounts to accommodate the growing birds or to a high level for the maintenance of the floor F of the poultry house H. When raising the level of the reservoir 30, conduit 50 and water cups 60 to the high level, such as is illustrated in broken lines in FIGS. 2 and 3, it is preferred that the hose 21 and drainage hoses first be disconnected since these hoses will normally not be long enough to extend to the overhead portions of the poultry house H. When in the high elevated position, a tractor T may till and treat the earthen floor of the poultry house H and other maintenance may be conducted. It should be understood that the floor is typically tilled and treated between each brood.

The basic operation of the gravity feed water distribution system 10 will now be described in greater detail with reference to FIG. 6. In this arrangement, water is arranged to flow from the cold water supply 20 through feed hose 21 to the reservoir 30 under pressure such as from a pump (not shown). The water fills the reservoir 30 up to the predetermined level L by the operation of the float valve 33. The reservoir 30 by connection of the connector hose 35 and the conduit 50 fills the water cups 60 to the desired level 61 by gravity feed. In other words, since gravity causes the water to seek the lowest level, as long as the water path is not obstructed, the water level will inherently be at a uniform height in the reservoir 30 and in all the water cups 60. In operation, the system 10 replenishes itself by periodically adding water to the reservoir 30 under control of the float 34 of the float valve 33 as the birds drink from the cups 60. Accordingly, due to the simplicity the system lo is highly reliable. In the preferred embodiment, the float valve 33 is responsive to a predetermined small decrease in the water level so as to maintain a generally constant level of drinking water in the drinking cups 60.

In a further aspect of the present invention, it should be noted that the reservoir 30 is filled with well water which is typically about 55 degrees Fahrenheit. During the summer, however, the poultry house H may get extremely warm, particularly in the upper portions of the poultry house H. Accordingly, the colder well water supply 20 is connected to the reservoir 30 by the feed hose 21 that runs along the floor F so that the water acquires as little heat energy as possible. In the preferred embodiment of the present invention, a temperature sensor 81 is positioned near the distal end of the conduit 50 remote from the reservoir 30 to sense the temperature of the water in the conduit 50. When the temperature sensor 81 senses that the water temperature is in excess of a predetermined high temperature, the system 10 causes the water in the conduit to be replaced with water of a lower temperature.

Referring to FIG. 6, the manner in which the system 10 replaces the water will now be explained. The preferred embodiment of the present invention includes a control box generally indicated by the numeral 100. The construction of the control box 100 does not form a part of the invention and accordingly it may take a variety of forms ranging from a complex computer to a set of simple relay switches. However, when the temperature of the water exceeds the predetermined temperature, the temperature sensor 81 provides a signal to the control box 100 indicating an excessive water temperature situation. The control box 100 then initiates a sequence of steps which accomplishes the replacement of the water in the conduit 50 and the drinking cups 60.

The first step interrupts the flow of drinking water from the reservoir 30 to the conduit 50. The control box 100 actuates a solenoid 82a (FIG. 6) to close the normally open valve 82 in connector hose 35. When the valve 82 is closed, the reservoir 30 will be permitted to retain the water therein at the predetermined level L while the conduit 50 and the water cups 60 are drained. To drain the conduit 50 and the drinking cups 60, the control box 10c actuates solenoids 83a and 84a to open normally closed valves 83 and 84, respectively. The valves 83 and 84 connect the conduit 50 by respective flexible drain hoses 86 to a suitable drain 85. Since the conduit 50 is open to the atmosphere through the water cups 60, the water flows freely through the open valves 83 and 84 and respective hoses 86 to the drain 85.

After several minutes, depending on the size of the conduit 50, the conduit 50 and the drinking cups 60 will be empty so as to allow refilling thereof with water of a lower temperature. The control box 100 uses time indicative signals from a timer 100a so as to conduct each step for a certain time interval. The system, however, may be provided with means to sense when the conduit 50 is empty so as to avoid any unnecessary delay.

In the next step, the control box 100 actuates the solenoids 83a and 84a to close the valves 83 and 84, respectively, and then actuates solenoid 82a to re-open valve 82. With the conduit 50 being empty and the reservoir 30 being full and the valve 82 being open, the water in the reservoir 30 quickly passes through the connector hose 35 and into the conduit 50. The float valve 33 then responds to the decreased water level in the reservoir 30 by allowing water from the cold water supply 20 to fill the reservoir 30 up to the predetermined level L and the water cups 60 up to the desired level 61. Since the reservoir 30 has much less surface area than the conduit 50, the water therein does not acquire as much heat energy as the conduit 50 and therefore has a lower temperature water therein for the birds to drink. Of course, if the temperature of the fresh water in the conduit 50 and water cups 60 is still higher than the predetermined temperature, than the system 10 would undertake a further replacement of the water.

Accordingly, by the foregoing series of steps, the warm water in the conduit 50 is replaced by cooler water which encourages greater consumption by the poultry. As a coincidence, the activity and noise of the flowing water from the drinking water distribution system 10, particularly the noise associated with refilling the conduit 50 raises the curiosity of the birds drawing their attention to the drinking cups 60 and to the fresh cooler water. Thus the process of refilling the conduit 50 and the drinking cups 60 actually encourages the birds to drink more water.

As discussed above in the background of the invention, it was noted that watering devices tend to be an excellent place for the growth of germs and bacteria which poses a health risk to the poultry. Moreover, once a drinking system is infected with bacteria or germs, they may spread very quickly throughout the entire flock. Accordingly, by the present invention, the drinking water system 10 is periodically cleaned and disinfected so as to kill bacteria and germs. The periodic cleaning cycle is controlled by the control box 100 and is usually conducted during a period of extended inactivity of the flock. A typical time to conduct the cleaning cycle is during the night. Basically, the cleaning cycle comprises draining the water from the reservoir 30 and conduit 50 and refilling the same with a cleansing liquid, preferably a liquid disinfectant. The liquid disinfectant is allowed to remain therein for a predetermined dwell period to cleanse the reservoir 30 and conduit 50 and water cups 60 and is subsequently drained. The system 10, thereafter is replenished with water.

The liquid disinfectant, such as chlorine bleach, is provided to the system 10 by a drum 110 or other large container. The drum 110 has a motor 111 mounted thereon with a pump 112 connected thereto to draw liquid disinfectant out of the drum 110. The motor 111 includes an on/off switch (not shown) which is actuated by the control box 100 to turn the motor 111 on and off. During normal operation of the system 10, the motor 111 is normally off so as not to waste energy. The pump 112 includes a draw pipe 112a extending down into the drum 110 and a hose 112b connected to a float valve 113 in the reservoir 30. The float valve 113 is similar to float valve 33 in that it includes a float 114 and is set to stop the flow of liquid disinfectant into the reservoir 30 when the level of the liquid disinfectant generally corresponds to the predetermined water level L.

Referring to FIG. 6, the process begins with the control box 100 receiving a time indicative signal from the timer 100a which matches the preprogrammed time at which the control box 100 is to conduct a cleansing cycle. The time of the cleansing cycle is preprogrammed by the farmer so as to suit the needs and circumstances of the installation. The control box 100 next actuates the solenoid 101a to close the normally open valve 101 in the feed hose 21 to interrupt the flow of water to the reservoir 30. Thus the reservoir 30, the conduit 50 and the water cups 60 are isolated from the water supply 20 and do not receive water therefrom. Once the flow of water to the reservoir 30 is interrupted, the control box 100 actuates the solenoids 83a and 84a to open normally closed valves 83 and 84 to drain the water in the reservoir 30, the conduit 50 and the water cups 60 to the drain 85. Within a few minutes, the system 10 is empty and by the control box 100 receiving the time indicative signals from the timer 100a moves on to the next step assuming the system 10 to be empty. The valves 83 and 84 are closed again by actuation of the solenoids 83a and 84a by the control box 100 and the system 10 is ready to receive the liquid disinfectant.

The control box 100 then actuates the on/off switch for the motor 111 so as to cause liquid disinfectant to flow from drum 110 to the reservoir 30. The liquid disinfectant passes through the float valve 113 into the system 10 until the level of liquid disinfectant in the reservoir 30 reaches approximately the predetermined water level L. As such, the water distribution system 10 is filled with a liquid disinfectant to a level generally corresponding to the water level during normal operation of the system 10. The liquid disinfectant remains in the system for a predetermined dwell period during which the liquid disinfectant is expected to be able to clean the reservoir 30, conduit 50, water cups 60, and other water carrying components of the system 10. Typically, the liquid disinfectant is retained in the system for a dwell period such as two to three minutes up to about 60 minutes, but preferably about thirty minutes. Once the predetermined dwell period has elapsed, the on/off switch of the motor 111 is actuated to stop pumping the liquid disinfectant to the system 10.

The system 10 may be drained of the liquid disinfectant directly to the drain 85 like the water. However, in the preferred embodiment of the invention, the liquid disinfectant is retained for further use. In a further aspect of the invention, the control box 100 actuates solenoid 115a to open normally closed valve 115. This causes the liquid disinfectant to drain through a hose 116 to a collection tank 120. The tank collection 120 is suitably sized to receive the liquid disinfectant drained from the system 10 from at least one cleaning cycle and is preferably positioned below the system 10 so as to allow the liquid to drain by gravity therein. The liquid disinfectant is retained an stored in the tank 120 for further use as will be explained below.

Once the reservoir 30, conduit 50 and water cups 60 have been drained of the liquid disinfectant, the control box 100 closes the valve 115 by actuating the solenoid 115a. The control box 100 then actuates the solenoid 101a to open the valve 101 so that drinking water from the cold water supply 20 flows through the float valve 33 to refill the system 10 up to the predetermined water level L so that the process of providing water to the poultry is resumed and the system is at least temporarily free of living germs and bacteria.

The present invention includes a further feature which reduces the growth of bacteria and germs between cleanings of the system. This process is accomplished by adding a disinfecting solution to the water in small quantities.

The disinfecting solution prevents the growth of germs and bacteria in the system 10 and also helps the birds fight diseases. In the preferred embodiment of the present invention, the process of adding a disinfecting solution to the water is accomplished by mixing the retained liquid disinfectant in collection tank 120 in small quantities or proportions with the cold water from the cold water supply 20 leading to the reservoir 30. To this end, the hose 21 which conducts water from the cold water supply 20 to the float valve 33 includes a proportioner valve 121 which includes a feed line 122 leading into the collection tank 120. The flow of the drinking water through the hose 21 causes the proportioner valve 121 to draw retained liquid disinfectant out of the collection tank 120 and mix it with the drinking water in a predetermined ratio. For example, in the preferred embodiment, chlorine bleach is used as the liquid disinfectant and it is added to the water at approximately one ounce to every gallon of water. Accordingly, the liquid disinfectant in the mixture acts to reduce or prevent the growth of bacteria and germs in the system 10 as noted above and it is also good for the poultry in that it tends to kill bacteria in the birds digestive tract which helps the birds fight diseases. The ratio of the disinfecting solution is, however, so small that it does not inhibit the birds from drinking the water.

As should be noted particularly in FIGS. 1 and 3 the drum 110 carries a substantial amount of liquid disinfectant which needs to be periodical)y replenished. While the drum is illustrated inside FIGS. 1 and 3 for simplicity, as being in the poultry house H, in the preferred arrangement the drum 110 and the collection tank 120 are both situated outside the poultry house H but within an enclosure adjacent the poultry house. This would also be a preferred location for the control box 100.

As a safety precaution, the system 10 further includes a bypass hose 130 connected to the reservoir 30 at a level just above the predetermined water level L. Accordingly, if the water level were to ever rise above the predetermined water level L, because of a float valve malfunction, the excess water will drain out of the reservoir 130 through the bypass hose 130. The other end of the bypass hose 130 is connected to the drain 85 such as by a connection with a drain hose 86, as illustrated in FIG. 6. It should be further noted, that the bypass hose 130 should be connected a distance above the predetermined water level L which is less than the distance the top edge of the drinking cups 60 are above the desired water level L. Accordingly, the water does not overflow the drinking cups 60 but rather is carried to the drain 85 by bypass hose 130.

The foregoing description is to be considered illustrative rather than restrictive of the invention and those modifications which come within the meaning and range of equivalents of the claims are to be included therein.

That which I claim is:

1. A relatively long poultry house of the conventional type having an earthen floor for the raising of fowl, such as turkeys, in combination with a gravity feed water distribution system for providing drinking water for the fowl in the poultry house and wherein the gravity feed water distribution system is characterized by leaving the floor of the poultry house substantially free of obstruction to movement of the fowl thereabout and wherein the water distribution system may readily be adjustably elevated as the fowl grow and increase in height and at times elevated to much higher levels to provide clearance for a tractor when it is desirable to till or clean the earthen floor of the poultry house, said gravity feed water distribution system comprising a reservoir for water including means for controlling the level of water in said reservoir, an elongate conduit connected in fluid communication to said reservoir and arranged to extend longitudinally throughout a substantial portion of said long poultry house, a plurality of drinking stations extending along said conduit and comprising spaced apart serially arranged water cups connected in open fluid communication to said conduit and extending upwardly therefrom, and means supported from upper portions of said poultry house for supportingly carrying said reservoir, conduit and drinking stations and for adjustably raising the same while maintaining the relative height relationship between said reservoir and said water cups, wherein as the fowl grow and increase in height, the drinking stations may be raised without impairment of the gravity feed of the water to the drinking stations.

2. The combination according to claim 1 further comprising water temperature sensing means positioned in the path of flow of the water from within said reservoir through said conduit and into said water cups for sensing the temperature of the water in the system, and means actuated by said water temperature sensing means for replacing water in the system in response to the sensed temperature of the water exceeding a predetermined temperature.

3. The combination according to claim 2 wherein said means for replacing water in the system comprises means for draining said conduit and water cups and means for replenishing said conduit and water cups with water of a lower temperature.

4. The combination according to claim 1 wherein said water distribution system further comprises preprogrammed means for purging and cleansing said reservoir, conduit and drinking stations, and wherein said preprogrammed means comprises: means for interrupting the flow of water to said reservoir; means connected to said reservoir, conduit and drinking stations for draining the water therefrom; means for substantially filling the drained reservoir, conduit and drinking stations with a liquid disinfectant to cleanse the same; means connected to said reservoir, conduit and drinking stations for draining the liquid disinfectant therefrom after a predetermined dwell period; and means for replenishing water to said reservoir, conduit and drinking stations after the liquid disinfectant has drained therefrom.

5. The combination according to claim 1 further comprising means for supplying water to said reservoir, and means connected to said water supply means for providing predetermined additives to the water for promoting the health of the poultry.

6. The combination according to claim 1 further comprising means for supplying water to said reservoir and wherein said means for controlling the water level in said reservoir comprises a float valve carried by said reservoir for sensing the level of water in said reservoir and for actuating the flow of water from said water supply means to said reservoir to maintain the water level in said reservoir at a predetermined desired level.

7. The combination according to claim 1 wherein said means for supportingly carrying said reservoir, conduit and water cups comprises a plurality of cables suspended from upper portions of said poultry house and winch means connected to said cables for simultaneously vertically adjusting each of said cables, wherein said cables have lower end portions connected to said reservoir and said elongate conduit and other portions connected to said height adjustment means such that actuation of said winch means vertically adjusts each of said cables simultaneously and thereby said reservoir and conduit.

8. The combination according to claim 7 further comprising means for individually adjusting an effective length of each cable independently of the remaining cables so as to maintain the conduit horizontal.

9. A relatively long poultry house of the conventional type having an earthen floor for the raising of fowl, such as turkeys, in combination with a gravity feed water distribution system for providing drinking water for the fowl in the poultry house and wherein the gravity feed water distribution system is characterized by leaving the floor of the poultry house substantially free of obstruction to movement of the fowl thereabout and wherein the water distribution system may readily be adjustably elevated as the fowl grow and increase in height and at times elevated to much higher levels to provide clearance for a tractor when it is desirable to till or clean the earthen floor of the poultry house, said gravity feed water distribution system comprising a reservoir for water including means for controlling the level of water in said reservoir, an elongate conduit connected in fluid communication to said reservoir and arranged to extend longitudinally throughout a substantial portion of said long poultry house, a plurality of drinking stations extending along said conduit and comprising spaced apart serially arranged water cups connected in open fluid communication to said conduit and extending upwardly therefrom, water temperature sensing means positioned in the path of flow of the water from within said reservoir through said conduit and into said water cups for sensing the temperature of the water in the system, means actuated by said water temperature sensing means for replacing water in the system in response to the sensed temperature of the water exceeding a predetermined temperature, means for supplying water to said reservoir, means connected to said water supply means for providing predetermined additives to the water for promoting the health of the poultry, and means supported from upper portions of said poultry house for supportingly carrying said reservoir, conduit and drinking stations and for adjustably raising the same while maintaining the relative height relationship between said reservoir and said water cups, wherein as the fowl grow and increase in height, the drinking stations may be raised without impairment of the gravity feed of the water to the drinking stations.

10. An apparatus for providing drinking water for poultry or the like comprising: a plurality of drinking stations at which the poultry may drink; a conduit connected in open fluid communication to said drinking stations; gravity feed means for delivering water along a path of flow through said conduit and into said drinking stations; means for sensing the temperature of the water in the path of flow of the water; and means for replacing the water in said conduit and drinking stations with water of a lower temperature in response to the sensed temperature of the water exceeding a predetermined temperature.

11. The apparatus according to claim 10 wherein said drinking stations are arranged at a substantially uniform height, and wherein said gravity feed means for delivering drinking water comprises: a reservoir; means connecting a lower portion of said reservoir to said conduit for supplying drinking water to said conduit from said reservoir by gravity feed; and means for maintaining a generally constant predetermined water level in said reservoir correlated to a desired water level in said drinking stations.

12. The apparatus according to claim 11 wherein said means for replacing the drinking water in said conduit comprises: means for interrupting the flow of water from said reservoir to said conduit in response to the sensed temperature of the water exceeding said predetermined temperature; means for draining water from said conduit and drinking stations while the flow of water is interrupted; and means for replenishing from said reservoir the water drained from said conduit and drinking stations.

13. The apparatus according to claim 10 further comprising means for adding in relatively small amounts a disinfecting solution upstream of the drinking stations to the drinking water to reduce bacterial growth in the water being provided to the poultry.

14. The apparatus according to claim 10 further including means for purging and cleansing said conduit and drinking stations which comprises: means for temporarily interrupting the delivery of water to said conduit and drinking stations; means connected to said conduit for replacing the water in said conduit and drinking stations with a liquid disinfectant to cleanse the same; means connected to said conduit for draining the liquid disinfectant from said conduit and drinking stations after a predetermined dwell period; and means for replenishing water to said conduit and drinking stations after the liquid disinfectant has drained therefrom.

15. An apparatus for providing drinking water to a poultry house for poultry or the like comprising: a plurality of water cups arranged at a substantially uniform height at which the poultry may drink; a conduit connected in open fluid communication to said water cups; a reservoir; means connecting a lower portion of said reservoir to said conduit for supplying a flow of water into said water cups by gravity feed; means for maintaining a predetermined level of water in said reservoir according to a desired water level in said water cups; means for sensing the temperature of the water in its course of flow into the water cups; means for replacing water in said conduit and water cups in response to the sensed temperature exceeding a predetermined temperature and including means for interrupting the flow of drinking water from said reservoir to said conduit in response to the sensed temperature of the water exceeding the predetermined temperature, means for draining the water from said conduit and water cups while the flow of water is interrupted, and means for replenishing the drained water to said conduit from said reservoir; and means for periodically purging and cleansing said reservoir, conduit and water cups and including: means for temporarily interrupting the delivery of drinking water to said reservoir; means for draining water from said reservoir, conduit, and water cups; means for substantially filling said reservoir, conduit and water cups with a liquid disinfectant; means for draining the liquid disinfectant from said reservoir, conduit and water cups after a predetermined dwell period; and means for replenishing the water drained from said reservoir, conduit and water cups.

16. The apparatus according to claim 15 further comprising means for retaining for reuse the liquid disinfectant drained from said reservoir, conduit and water cups; and means for adding the retained liquid disinfectant to the water in relatively small amounts to reduce bacterial growth in the water being supplied to the water cups.

17. An apparatus for providing drinking water to a poultry house for poultry or the like, comprising: a plurality of drinking stations at which the poultry may drink; a conduit connected in fluid communication to said drinking stations; means connected to said conduit for delivering drinking water to said drinking stations; and preprogrammed means for purging and cleaning said conduit and drinking station and comprising means connected to said water delivering means for periodically interrupting the delivery of drinking water to said conduit and drinking stations; means connected to said conduit for replacing the drinking water in said conduit and drinking stations with a liquid disinfectant; means connected to said conduit for draining the liquid disinfectant from said conduit and drinking stations after a predetermined dwell period; and means for replenishing water to said conduit and drinking stations after the liquid disinfectant has drained therefrom.

18. The apparatus according to claim 17 wherein said drinking stations are arranged at a substantially uniform height, and wherein said means for delivering drinking water comprises: a reservoir; means connecting a lower portion of said reservoir to said conduit for supplying a flow of water into said drinking stations by gravity feed; and means for maintaining a generally constant predetermined water level in said reservoir correlated to a desired water level in said drinking stations.

19. The apparatus according to claim 18 wherein said means for interrupting the delivery of water comprises means for interrupting the flow of water to the reservoir and wherein said means for replacing the water in said conduit and drinking stations with a liquid disinfectant comprises means for draining water from said reservoir, conduit and drinking stations and means for substantially filling said reservoir, conduit and drinking stations with a liquid disinfectant, and wherein the apparatus further comprises means for retaining the drained liquid disinfectant for reuse and means for adding the retained liquid disinfectant to the water upstream of the drinking stations.

20. The apparatus according to claim 17 wherein said means for replacing the water in the conduit with liquid disinfectant comprises means for draining the water from the conduit and drinking stations, and means for substantially filling the drained conduit and drinking stations with a liquid disinfectant.

21. The apparatus according to claim 17 further including means for adding a disinfecting solution to the water upstream of the drinking stations in small proportions to reduce bacterial growth in the water being provided to the poultry.

22. The apparatus according to claim 17 wherein said means for replacing the water in the conduit with a liquid disinfectant comprises means for draining water from the conduit and drinking stations and means for substantially filling the drained conduit and drinking stations with a liquid disinfectant, and wherein the apparatus further comprises means for retaining for reuse the liquid disinfectant drained from said conduit and drinking stations, and means for adding in relatively small amounts the retained liquid disinfectant upstream of the drinking stations to the drinking water to reduce bacterial growth in the water being provided to the poultry.

23. A method of providing drinking water in a poultry house for poultry or the like comprising the steps of: suspendingly supporting a reservoir of water and a conduit in fluid communication therewith above the floor of the poultry house with the conduit being generally horizontally disposed and having a plurality of water cups connected thereto and extending upwardly therefrom in open fluid communication; supplying water to the water cups by gravity feed from the reservoir through the conduit; and maintaining a generally constant predetermined water level in the reservoir correlated to a desired water level in the water cups.

24. The method according to claim 23 further comprising raising the suspendingly supported reservoir and conduit during the growth cycle of the poultry for facilitating accessibility of the water to the poultry and thereby enhancing their growth.

25. The method according to claim 23 further comprising sensing the temperature of the water in its path of flow from within the reservoir through the conduit and into the water cups; and replacing water in the conduit and water cups with water of a lower temperature in response to the sensed temperature of the water exceeding a predetermined temperature.

26. The method according to claim 25 wherein the step of replacing the water in the conduit comprises: interrupting the flow of water from the reservoir to the conduit in response to the sensed temperature of the water exceeding the predetermined temperature; draining the water from the conduit and water cups while interrupting the flow of water thereto; and replenishing from the reservoir the water drained from the conduit and water cups.

27. The method according to claim 23 further including the step of adding a disinfecting solution upstream of the water cups to the water in relatively small proportions to reduce bacterial growth in the water being provided to the poultry.

28. The method according to claim 23 which includes periodically purging and cleansing the reservoir, conduit and water cups which comprises: interrupting delivery of water to the reservoir; draining the water in the reservoir, conduit and water cups; directing a liquid disinfectant into the reservoir so as to substantially fill the conduit and water cups; draining all the liquid disinfectant after a predetermined dwell period; and thereafter replenishing water to the cleansed reservoir, conduit and water cups.

29. A method of providing drinking water for poultry or the like comprising the steps of: delivering water through a conduit to a plurality of drinking stations at which the poultry may drink; sensing the temperature of the water in the path of flow of the water into the drinking stations; and replacing water in the conduit and drinking stations with water of a lower temperature in response to the sensed temperature of the water exceeding a predetermined temperature and wherein the step of replacing the water in the conduit and drinking stations with water of a lower temperature comprises: interrupting the flow of drinking water from the reservoir to the conduit in response to the sensed temperature of the water exceeding said predetermined temperature; draining water from the conduit and drinking stations while the flow is interrupted; and replenishing the water to the conduit and drinking stations from the reservoir.

30. The method according to claim 29 further including the step of adding a disinfecting solution to the drinking water in relatively small proportions to reduce bacterial growth in the water being provided to the poultry.

31. The method according to claim 29 further comprising the step of purging and cleansing the conduit and drinking stations which comprises: interrupting the delivery of drinking water to the conduit; replacing the water in the conduit and drinking stations with a liquid disinfectant; draining the liquid disinfectant from the conduit and drinking stations after a predetermined dwell period; and thereafter replenishing water to the thus cleansed conduit and drinking stations.

32. A method of providing drinking water to a poultry house for poultry or the like comprising the steps of: arranging a plurality of water cups at a substantially uniform height at which poultry may drink; supplying water through a conduit to the water cups from a reservoir by gravity feed; maintaining a generally constant predetermined drinking water level in the reservoir correlated to a desired water level in the water cups; sensing the temperature of water in the path of flow of the water from within the reservoir, through the conduit and into the water cups; replacing water in the conduit and water cups with water of a lower temperature in response to the sensed temperature exceeding a predetermined relatively warm temperature by interrupting the flow of drinking water from the reservoir to the conduit in response to the sensed temperature of the water exceeding the predetermined temperature, draining the drinking water from the conduit and drinking stations while the flow is interrupted, and replenishing the drained water to the conduit from the reservoir; and periodically purging and cleansing the reservoir, conduit and water cups by the steps of: periodically interrupting the supply of drinking water to the reservoir; draining the water in the reservoir, conduit and drinking stations while the supply of drinking water is interrupted; substantially filling the reservoir, conduit and drinking stations with a liquid disinfectant; draining the liquid disinfectant from the reservoir, conduit and water cups after a predetermined dwell period; and thereafter replenishing water to the cleaned reservoir, conduit and water cups.

33. The method according to claim 32 further comprising the steps of: retaining for reuse the liquid disinfectant drained from the reservoir, conduit and water cups; and adding the retained liquid disinfectant to the water upstream of the drinking cups in relatively small amounts to reduce bacterial growth in the water being provided to the poultry.

* * * * *

UNITED STATES PATENT AND TRADEMARK OFFICE
CERTIFICATE OF CORRECTION

PATENT NO.   : 5,025,754
DATED        : June 25, 1991
INVENTOR(S)  : David Plyler It is certified that error appears in the above-identified patent and that said Letters Patent is hereby corrected as shown below:

Column 5, line 20, "1o" should be --10--.

Column 7, line 24, "1o" should be --10--.

Column 7, line 68, "10c" should be --100--.

Signed and Sealed this

Eleventh Day of May, 1993

Attest:

MICHAEL K. KIRK

*Attesting Officer*   Acting Commissioner of Patents and Trademarks